Figure 1:
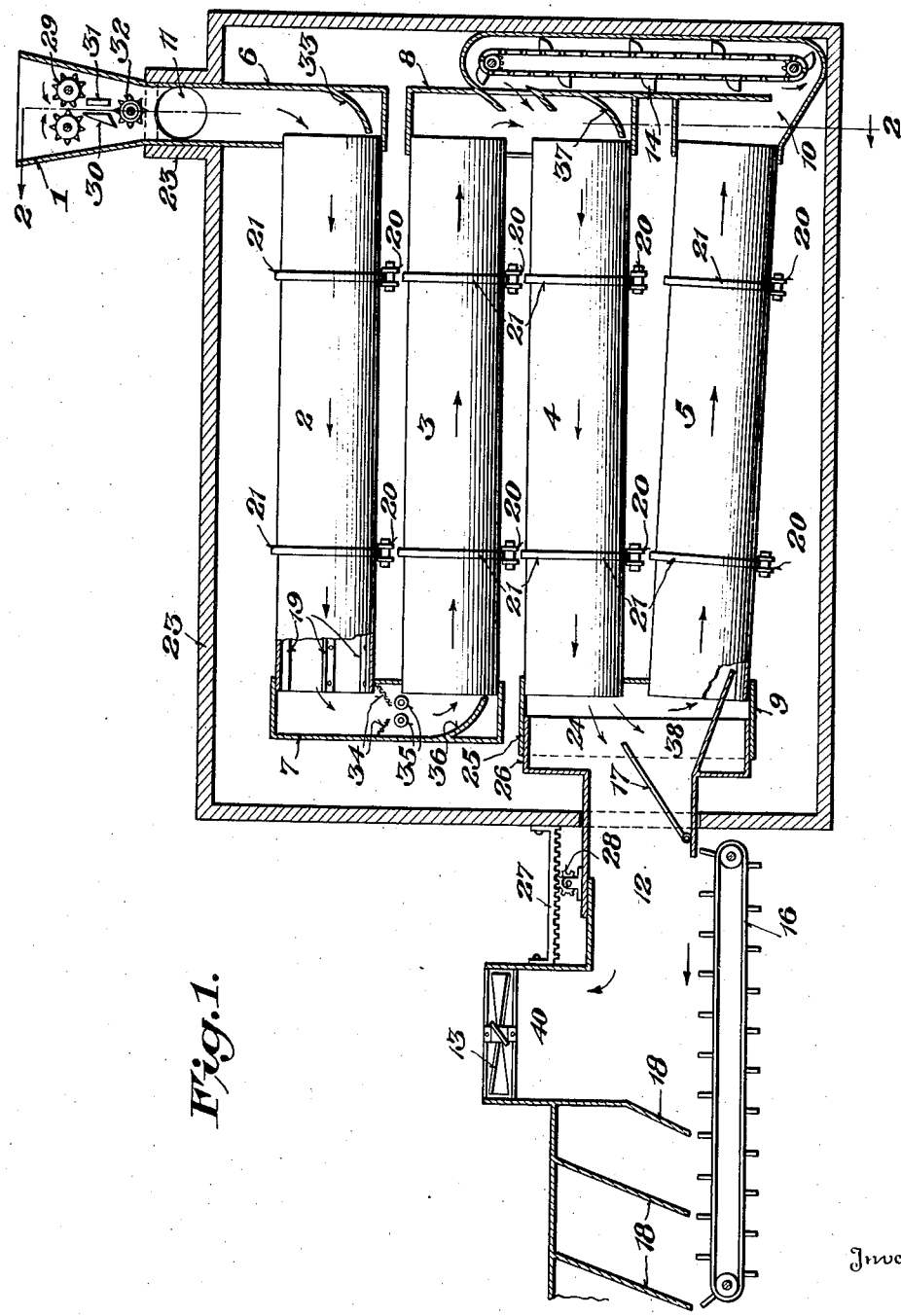

March 12, 1935.  R. R. GRAVES  1,994,343

APPARATUS FOR DRYING FODDER

Filed March 25, 1932   2 Sheets-Sheet 1

Inventor
Roy R. Graves,
By K. P. McElroy
Attorney

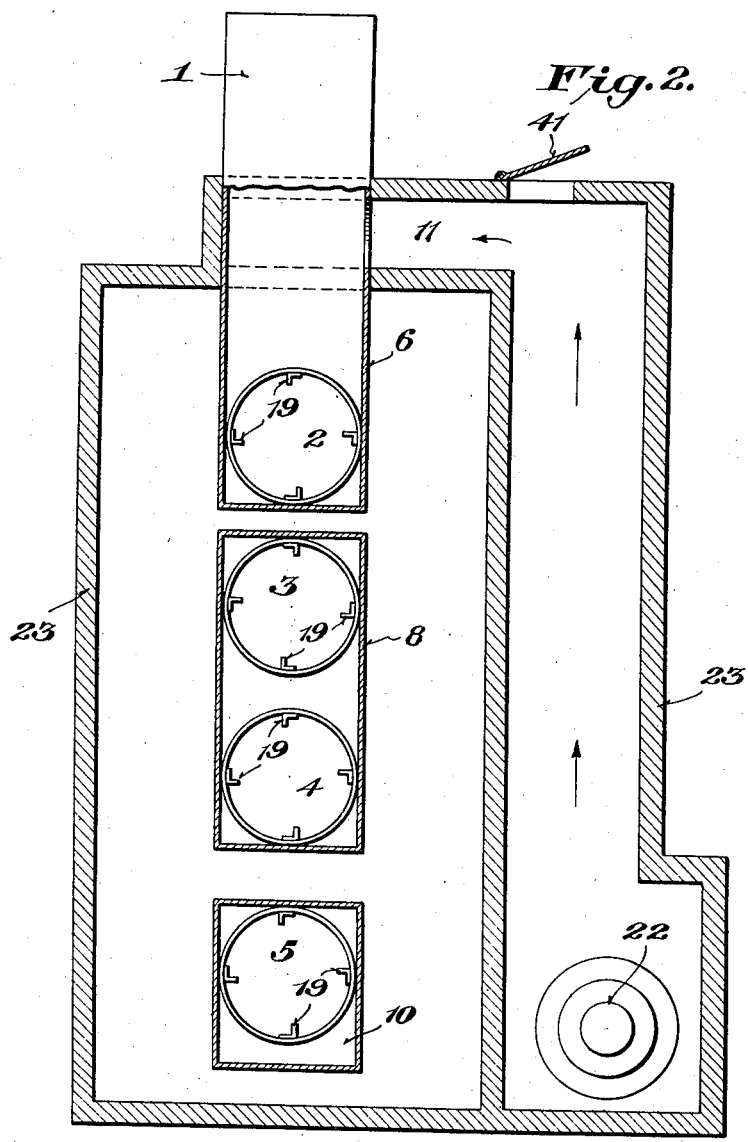

Patented Mar. 12, 1935

1,994,343

UNITED STATES PATENT OFFICE 1,994,343

APPARATUS FOR DRYING FODDER

Roy R. Graves, Kensington, Md.

Application March 25, 1932, Serial No. 601,268

7 Claims. (Cl. 34—6)

This invention relates to apparatus for drying fodder; and it comprises an equipment for carrying out the later described process comprising at least four rotary drums mounted in series, means for pressing the fodder after it has passed through at least one of said drums, means at the exit of the last drum for returning insufficiently dried fodder to one of the preceding drums, an air separating chamber for fodder intermediate the last two of said drums, and means for adjusting the dryness of the discharged fodder; all as more fully hereinafter set forth and as claimed.

In the usual and well known process of producing field cured fodder, shortly after cutting, the fodder is raked together in cocks or windrows where it is left to dry in the field. Drying always takes several days and may take weeks during damp weather, during which time the fodder is exposed to dew and frequently to rain. Clover and alfalfa frequently carry as much as 40 per cent of water soluble materials, these constituting by far the most important proportion of the entire nutritive value and including most of the vitamins and enzymes. It is evident therefore that loss by leaching caused by dew and rain may frequently approach even 40 per cent by weight. Another important loss is caused by leaf shattering.

When dry, the leaves tend to crumble upon mechanical handling or upon repeated access of moisture followed by drying. In the usual field curing methods this so-called shattering loss averages 15 per cent or more of the most nutritive portions of the fodder. The leaves contain about 70 per cent of the total nutritive value. During damp weather fermentative processes frequently set in and fungoid growths may be encountered. Prolonged drying apparently reduces the digestibility of the feed, the green or unripened forms of cellulose and proteids being converted into less available forms. There is not only a loss of actual nutritive value but the values remaining become less palatable.

During the field curing of fodder, as above described the ratio of available proteids and carbohydrates to stemmy or woody matter is greatly reduced. Freshly cut hay contains in addition to the well known A, B and C vitamins, the more recently discovered vitamin E, about which little is known save that it is important in promoting the fertility of animals. All of these values become seriously reduced during the usual hay making procedure.

The above mentioned disadvantages of field curing methods have long been recognized and several attempts have been made to devise other less wasteful processes. While some of these methods have possessed certain advantages over field curing, few of them have as yet been employed on any but a semi-commercial scale. The processes have been too expensive and the equipment used too complicated.

In a copending application, Ser. No. 149,684, I have described and claimed a process for obviating the larger proportion of the losses described above. In this process the freshly cut fodder is cut into short lengths and passed through a drying apparatus wherein the comminuted fodder is tumbled and exposed to the action of warm humid air while traveling in a circuitous passage. The exposure to heat is short and the temperature of the fodder is at all times maintained well below the point at which loss of vitamins might be occasioned. The present invention is in some respects an improvement upon that of my acknowledged copending application.

I have found that an important advantage is secured in the drying of fodder if partially dried material is crushed or pressed to squeeze the naturally occurring juices from the woody or pithy portions, usually in the stems, these juices being then absorbed by the dryer portions of the fodder with which they come in contact. When the fodder has been partially dried prior to crushing, I have found that the expressed juices are absorbed to a considerable extent by the leafy portions of the fodder, which are at that stage substantially dryer than the stems and woody portions. The leafy portions of my artificially dried fodder thus contain a larger proportion of the total nutrient value than is the case with fodder which has not been crushed during drying.

But the crushing or pressing of the fodder after partial drying has another important function. It is known that the most difficult parts of the plants to dry, whether by field curing or artificial drying, are the heavy stalks or stems. I have found that in many plants the centers of the pithy stems retain moisture even after the outer part has been scorched by heat in a drying operation. The difficulty in curing is that the leaves and fine stems become over dry and therefore brittle, resulting often in their being crushed, reduced to powder and lost, before the heavy stems are sufficiently dry to permit storage of the hay as a whole. If the hay is stored there may be sufficient moisture left in these heavier stems to cause the entire mass of stored hay to heat and thus cause spontaneous combustion and loss by fire.

Another difficulty encountered in properly drying a fodder without crushing is caused by the hollow stem plants such as rye and peas. The stems of these plants are light and in an air separating step they are likely to accompany the lighter leafy material which is thoroughly dry. These hollow stalks are, however, extremely difficult to dry to a moisture content, say of 15 per cent, below which there is no danger of heating and fermentation in storage.

I have found that the above difficulties can be overcome by use of the crushing step of my process. This crushing flattens the stems until they are about as easily dried as are the leafy portions of the plant. Moreover the gravimetric density of the thoroughly dried, crushed stalks approaches that of the dried leafy portions of the fodder. The presence or absence of moisture therefore determines, to a large extent, the weight of the material. Separation of the fodder can thus be made on the basis of moisture content. This forms the basis of what I have called "selective drying".

In the apparatus forming part of my invention I have arranged for air separation of the fodder into two parts. One part which has been dried to the desired extent is withdrawn as a finished product while the other part having a larger moisture content is returned to be sent back over at least part of the drying cycle. If the fodder is not crushed prior to the described air separation, the separation is no longer strictly on the basis of moisture content. Moreover the heavy stems are likely to become trapped in the return cycle and may be kept at the high temperature of the dryer for long periods. The vitamin content of the fodder and its digestibility would be greatly reduced by such a prolonged exposure to heat.

By crushing or pressing the partially dried fodder the drying process as a whole is made easier. Since all parts of the fodder are pressed to about the same thickness the penetration of heat and the evaporation of moisture is quite uniform. A lower temperature of drying can be employed or the time of drying can be shortened. Either of these procedures has an important bearing on the preservation of the vitamin content and digestibility of the feed.

There is a considerable tendency among the smaller farm animals, such as poultry, to discard the stemmy portions of a dried fodder. Since these portions contain a substantial portion of the mineral and nutrient content, a large part of these values may be lost. I have found that these stemmy portions are consumed to a considerably greater extent if they are softened by crushing. Moreover, as mentioned above, the leafy portions of my fodder contain a considerable amount of the nutrient values occurring naturally in the stemmy portions. The result is that the smaller animals eating my fodder secure a substantial portion of the food value contained in the woody portions merely by eating the leafy portions and at the same time they have less tendency to discard the woody portions. The net result is a considerably increased consumption of nutritive values.

A particularly desirable product for feeding poultry, etc., which can be produced from fodder dried according to my invention is a leaf meal, such as alfalfa. Such a meal can be produced by separation of the leafy parts, usually by grinding and sieving. I have found that a leaf meal thus produced contains a considerably greater mineral and nutrient content than similar meals produced by other drying processes. I ascribe the difference to the absorption by the leafy portions of the fodder of juices pressed from the stems during the crushing step of my process.

When fodder is cut and dried on the field some action ensues which largely destroys the vitamin content. There appears to be an action distinct from the mere leaching effect caused by dew and rain. It is possible that this is due to the exposure to sunlight but it is more likely due to the long periods of exposure to moderately high temperatures. Vitamins are destroyed in larger proportion by a prolonged drying at moderate temperatures than by a shorter drying at more elevated temperatures, the total drying effect being the same in the two cases. Whatever may be the true explanation I have demonstrated by many experiments that my improved fodder possesses a substantially greater vitamin content than field cured fodder. In fact my experiments show that my new fodder contains substantially all the nutrient values of fresh cut fodder with the original components in substantially their original ratios, this including such water soluble constituents as vitamins and enzymes.

I have also found that my new fodder is capable of substantially reproducing the freshly cut fodder upon the addition of water. The dried material swells rapidly in water and substantially assumes its natural color and texture. The swelling power of my fodder is nearly twice that of field cured fodder. Even in the dry state the color is of a considerable more greenish tinge than is that of field cured fodder.

My invention can be described more conveniently in connection with the accompanying drawings which illustrate, more or less diagrammatically, certain organizations of apparatus elements within the purview of my invention and susceptible of use in my process. In this showing Fig. 1 represents a side elevation, partly in section, of my drying equipment, while Fig. 2 represents an end sectional view along the line 2—2 of Fig. 1.

In the figures like elements are designated by like reference numerals.

The drying equipment is made up of a feed hopper 1, four rotary drums or cylinders 2, 3, 4 and 5, stationary cylinder ends 6, 7, 8, 9 and 10, hot air shaft 11, an elevator 14, discharge flue 12, suction shaft 40, fan 13, discharge conveyor 16, discharge apron 17, and air baffles 18.

The rotary drums 2, 3 and 4 may be horizontal or only slightly tilted, reliance being placed upon the velocity of the air currents to propel the fodder through the drums. The drum 5, however, in which the motion of the fodder is opposed to the velocity of the air, must either be tilted or provided with some means of propulsion for the fodder, such as a spiral baffle or a worm screw. All the drums are advantageously provided with angle irons 19 which serve as lifting scoops to tumble the fodder through the heated air. These may be spiraled around the drum, if desired, to assist in the propulsion of the fodder through the drums.

The drums may be supported on doubly flanged rollers which cooperate with tracks 21 mounted on the drums. The drums are rotated by a source of power, not shown, applied to the rollers 20, or by other equivalent means. The cylinder ends and rollers may be supported by a framework of conventional form, not shown. If desired, the cylinders may be driven at unequal rates. It is of some advantage, for example, to drive the upper cylinders faster than the lower ones in order to shorten the exposure of the fodder to the higher temperatures which prevail in the upper cylinders. This is in harmony with the lessened bulk of the material as it loses moisture.

Hot air may be supplied to the rotating drums from any convenient source, such as the oil burner 22 shown in Fig. 2. This source of heated air is shown connected with the drying apparatus by flue 11. The temperature and velocity of the heated air can be regulated both by the size of the flame and by the opening of the air inlet, not shown. The damper 41 also assists in this regulation. If desired, thermostatic control may be applied to the oil burner, to the air inlet or to the damper 41, in order to control the temperature of the heated air. Both the hot air shaft 11 and the rotating drums are advantageously enclosed by heat insulated walls 23.

An air separating chamber 24 is interposed intermediate the last two rotary drums. This chamber is provided with means for adjusting the dryness of the discharged material. For example the chamber may be constructed in two sections with overlapping sides 25 and 26 forming a slidable fit. The outer section may form a continuation of the discharge conduit 12 and be capable of adjustment, for example, by means of a rack 27 and pinion 28. An adjustable discharge apron 17 may also be provided to regulate the dryness of the discharge material by its angle of tilt. The baffles 18 above the discharge conveyor 16 are placed in such a position as to exclude the outside air from the suction created by the fan 13.

It is highly advantageous to place the fan 13 in such a position that the dried fodder by-passes the same. If the dry fodder is sucked through the fan a considerable amount is pulverized by impact with the fan blades. But animals do not relish a powdered fodder. Moreover, with the fan in the position shown, no stones or sticks which may be raked up with the green material come in contact with the fan, thus greatly reducing the liability of damage to the equipment. The discharge conduit 12 is made of sufficient diameter to reduce the velocity of the fodder to the point at which even the finer portions fall to the bottom to be picked up by the conveyor 16.

The operation of my drying equipment is as follows: Freshly cut fodder to be dried is placed in the receiving hopper 1. The feed rolls 29 push the fodder at a regulated speed past the table 30 and pressure plate 31. The rotary cutter 32 then comminutes the fodder into any desired degree of fineness. The cut fodder meets a stream of hot air from the shaft 11 and drops down the cylinder end 6 where it strikes the guiding baffle 33, being thus introduced into the rotating drum 2. In the latter the fodder is lifted and then tumbled through the hot air by means of the angle irons 19. The velocity of the air and/or the pitch of the drum gradually propel the fodder to the opposite end of the drum. By the time the fodder reaches the cylinder end 7, the leafy portions are substantially dry while the woody portions and stalks contain most of their original moisture. This material is tumbled out of the cylinder 2 on to a screen funnel 34 which guides the same to the crushing or pressing rolls 35. These rolls crush the stems and woody portions, squeezing out the naturally occurring juices. However the partial drying is sufficient to prevent waste of the juice which is readily taken up and absorbed by the substantially dry leafy portions of the fodder. Part of the nutrient values contained in the stems and woody portions is thus transferred to the leafy portions which are already the most palatable.

After passing through the rollers 35, the pressed fodder drops to the baffle 36 at the bottom of cylinder end 7 which guides the same into the rotary drum 3. In this drum it is again tumbled in a current of heated air which may serve to propel the fodder through the drum. At the end of drum 3 the fodder falls on baffle 37 which guides it into rotary drum 4, the heated air following the same path. The temperature of the air should be controlled so that the temperature of the fodder itself should never rise substantially above 200° F. This insures a maximum digestibility and vitamin content in the finished product.

At the exit of drum 4 the fodder enters an air separating chamber 24. The heated air in this chamber flows above the discharge apron 17 and into the flue 12. Any fodder which has been sufficiently dried to be picked up by this air current also follows this path. This fodder, however, drops to the bottom of shaft 12 and on to the discharge conveyor 16, the heated air being sucked out by the suction shaft 40 and fan 13. The conveyor 16 delivers the dried fodder past the swinging baffles 18 and discharges the same at any convenient point.

The fodder which is insufficiently dry to be floated up by the air current passing above baffle 17 drops to the bottom of the air separating chamber and strikes baffle 38 which directs it into the last rotary drum 5. As mentioned, this drum is tilted downwards or may be provided with propelling means to cause the fodder to pass through the drum in a direction opposed to the current of air which flows towards the air separating chamber. After discharge from drum 5, the fodder is picked up by an elevator 14 or other conveying means and may be returned to the entrance of drum 4. The fodder may be thus recycled through drums 4 and 5 until sufficiently dry to be floated up by the air currents passing above the apron 17. As mentioned previously the dryness of the discharged material may be closely regulated by the angle of tilt of the apron 17 and by moving the end 26 of the separating chamber backward or forward.

A return cycle for the insufficiently dried feed is quite essential in order to obtain a uniformly dried product. In ordinary practice not all of the green material enters the dryer with the same percentage moisture. There may be delays in raking and cutting with the result that some of the material is partially sun dried. Or there may be some old material left on the field, that is gathered up with the newly cut material. This dry or partially dry material is likely to be burned or scorched if it has to travel the same distance and time in the dryer as the unwilted material. With selective drying and crushing this scorching of the partially dry or thoroughly dry material will be prevented because such high temperatures will not be required and because the dry material will escape from the dryer as rapidly as do the lighter more quickly dried parts of the green material. My drying equipment may be adjusted so that any fodder which has been partially field dried makes a single passage through the drums 2, 3 and 4, while any freshly cut fodder passes at least once through the return cycle of drums 5 and 4.

It appears to be of some advantage to supply heated air to my drying equipment having a minimum oxygen content. This may be accomplished by closing the air inlet to the burner 22 to the point at which only slightly more air is admitted than is required for actual combustion. I have found that the fodder thus dried in the substantial exclusion of oxygen has a somewhat higher vitamin content than fodder dried in air containing a more normal amount of oxygen.

As the invention has been described the heated air from flue 11 passes concurrently with the motion of the fodder in rotary drums 2, 3 and 4 and countercurrent in drum 5. The direction of the air currents is not an essential part of my invention, however. While four drums have been shown and described this number may be added to without departing from the scope of my invention. In this case the elevator 14 may be used to deliver the recycled fodder to any one of the drums which is closer to the entrance. In the arrangement shown in the figures it is evident that the elevator may be arranged to introduce the recycled fodder into drum 2, instead of drum 4. If desired, it is possible to change the position of the press rollers. The pressing operation can be carried out directly after the comminution of the fodder provided the crushing is done within the dryer or provided the fodder has been dried sufficiently to prevent waste of the juices contained in the stems and woody portions. Such partial drying can be accomplished in the field, for example. Various other modifications may be made in my process and drying equipment without departing from the scope of my invention.

My invention enables an important saving of time in the harvesting of crops. The time elapsed between the cutting of the fodder and drying ready for storage usually amounts to considerably less than an hour. For most crops it takes only from 5 to 20 minutes to pass through my drying equipment.

The most important features of my invention appear to be as follows:

1. Selective drying combined with air separation on the basis of moisture content which permits the removal from the dryer of the leaves and lighter stems as soon as they are dry.

2. The retention in the dryer of the heavier parts, with consequent additional exposure to heat and air current, until their moisture content has been reduced to the desired level, the additional exposure being in a low-temperature part of the drying cycle.

3. The crushing of the heavier parts within the dryer for the purpose of facilitating the drying of the heavier parts and to avoid loss of any nutrients contained in the juices that may be expressed.

4. Drying as quickly as possible and yet at temperatures such that the material itself will not be heated much in excess of 200° F.

It is only by processes including these features that dehydrated materials are produced with a nutritive content substantially unchanged from that present in the green form.

While my invention is particularly suited for the drying of such fodder as alfalfa, timothy, clover, cow peas, soy beans and the like, it may also be applied to leafy fresh vegetables, corn stover and other materials which can be classed under the heading of fodder. It is only necessary that a substantial portion of the fodder be of leafy nature which portion enables the air separation to be effective as well as providing for the leafy absorption of the juices which are squeezed from the stems and woody portions. In fodders of this nature my process provides for the recovery of a considerably larger proportion than usual of the nutritive values present in the growing crop and retention of the vitamin and water soluble constituents.

What I claim is:

1. A fodder drying equipment comprising at least four rotary drums operating in series, a hot air shaft to supply heated air to said drums, end connections to transfer said heated air and the fodder being dried from one drum to another, an air separating chamber interposed between the last two drums of the series and means for crushing said fodder interposed between two other of said drums.

2. The drying equipment of claim 1 wherein a conveying means is positioned at the exit of the last rotating drum to convey imperfectly dried fodder to the entrance of one of the preceding drums.

3. An equipment for drying fodder comprising at least four rotary drums mounted in series, means for pressing the fodder after it has passed through at least one of said drums, means at the exit of the last drum for returning insufficiently dried fodder to one of the preceding drums, an air separating chamber intermediate the last two drums of said series and means for adjusting the dryness of the discharged fodder.

4. A drying equipment comprising at least four rotary drums mounted in series, a feed hopper and a hot air shaft attached at one end of said series for feeding material to be dried and hot air to said series, an air separating chamber interposed between the last two drums of said series, a discharge flue and a suction shaft connected to said air separating chamber and means for varying the dryness of the material separated in said air separating chamber.

5. In an apparatus for drying fodder, means for passing fodder in tumbling motion through a plurality of drying zones connected in series, means for supplying heated air to said drying zones, means for crushing said fodder interposed between two of said drying zones and means for classifying the fodder as to dryness at the exit of said drying zones.

6. In an apparatus for drying fodder, a plurality of rotating drums connected in series for tumbling the fodder in a current of heated air while passing it through said series, means interposed between the last two drums of said series for separating by air classification dried fodder from undried fodder, means for collecting the fodder passing from the last drum of said series and for passing it to a drum of said series preceding said air classifying means, and means for crushing said fodder prior to completion of said drying.

7. The apparatus of claim 6 wherein four rotating substantially horizontal drums are employed, these drums being positioned one above the other.

ROY R. GRAVES.